(12) United States Patent
McClure et al.

(10) Patent No.: US 8,959,883 B2
(45) Date of Patent: Feb. 24, 2015

(54) HOOK ROTOR STRIPPER

(71) Applicant: CNH America LLC, New Holland, PA (US)

(72) Inventors: John R. McClure, New Holland, PA (US); William Dale Hotaling, New Holland, PA (US); Chandrashekhar Singh, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 96 days.

(21) Appl. No.: 13/654,696

(22) Filed: Oct. 18, 2012

(65) Prior Publication Data

US 2014/0109542 A1    Apr. 24, 2014

(51) Int. Cl.
*A01D 39/00*    (2006.01)

(52) U.S. Cl.
USPC ................................. 56/341; 56/364

(58) Field of Classification Search
USPC .................................... 56/341, 364
See application file for complete search history.

(56) References Cited

U.S. PATENT DOCUMENTS

| | | | |
|---|---|---|---|
| 3,226,921 A | 1/1966 | Shepley | |
| 3,613,345 A | 10/1971 | Cofer | |
| 3,713,283 A | 1/1973 | Fritz | |
| 3,924,391 A | 12/1975 | Cheatum | |
| 4,161,859 A | 7/1979 | Storm et al. | |
| 4,854,454 A * | 8/1989 | Dahlby | 209/616 |
| 5,426,928 A | 6/1995 | Frimml et al. | |
| 5,581,976 A | 12/1996 | Underhill | |
| 5,979,153 A | 11/1999 | Roth | |
| 6,279,304 B1 | 8/2001 | Anstey et al. | |
| 6,295,797 B1 | 10/2001 | Naaktgeboren et al. | |
| 6,314,708 B1 | 11/2001 | Engel | |
| 6,314,709 B1 | 11/2001 | McClure et al. | |
| 6,370,856 B1 | 4/2002 | Engel | |
| 6,526,736 B1 | 3/2003 | Anstey | |
| 6,644,006 B1 | 11/2003 | Merritt et al. | |
| 6,651,418 B1 | 11/2003 | McClure et al. | |
| 6,688,092 B2 | 2/2004 | Anstey et al. | |
| 6,877,304 B1 | 4/2005 | Smith et al. | |
| 6,988,354 B1 | 1/2006 | Pargmann et al. | |
| 7,124,568 B2 | 10/2006 | Hotaling | |
| 7,478,523 B2 | 1/2009 | McClure et al. | |

FOREIGN PATENT DOCUMENTS

EP    1616475 A1    1/2006

\* cited by examiner

*Primary Examiner* — Thomas B Will
*Assistant Examiner* — Mai Nguyen
(74) *Attorney, Agent, or Firm* — Patrick M. Sheldrake; Seyed V. Sharifi T.

(57) ABSTRACT

Rotor strippers are sized and shaped to securely fit between adjacent rotor fingers on a rotor shaft of a rotor for stripping crop material and for conveying the crop material to a bale chamber for forming a bale. Each rotor stripper is formed of a segment comprised of two opposing side walls with an interior section extending between the two opposing side walls. A first end portion has a curved hook section shaped to securely fit around a majority portion of the rotary shaft for secure engagement therewith; a second end portion is secured to a backbone portion of the rotor allowing the segment to remain fixed with respect to rotation of the rotary shaft; and a middle portion extends between the first and second end portions in a curved manner.

20 Claims, 7 Drawing Sheets

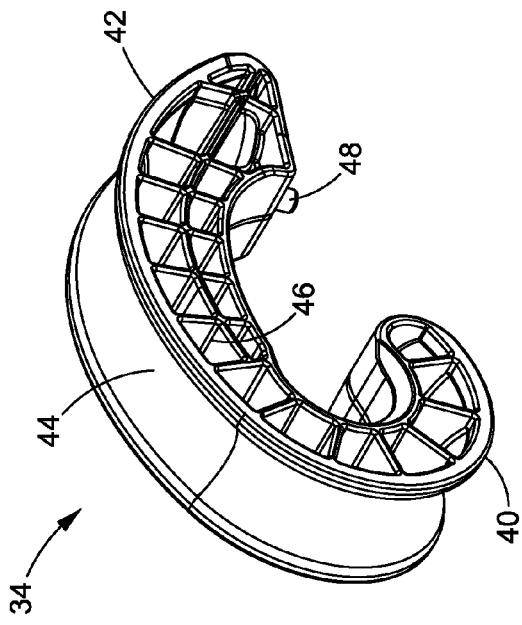
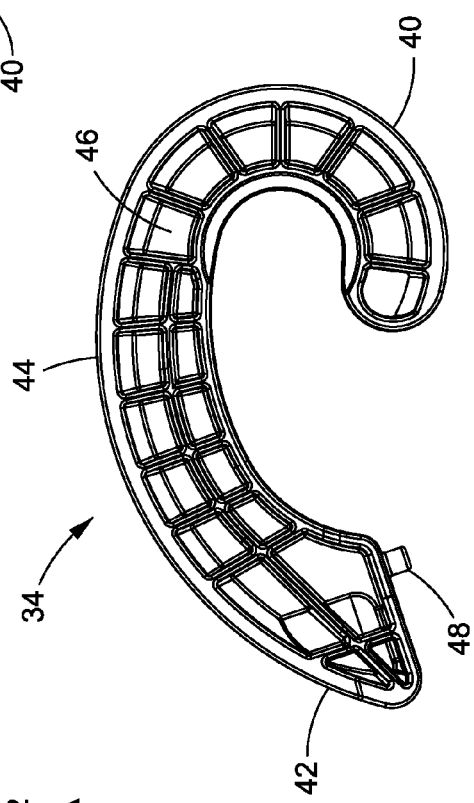
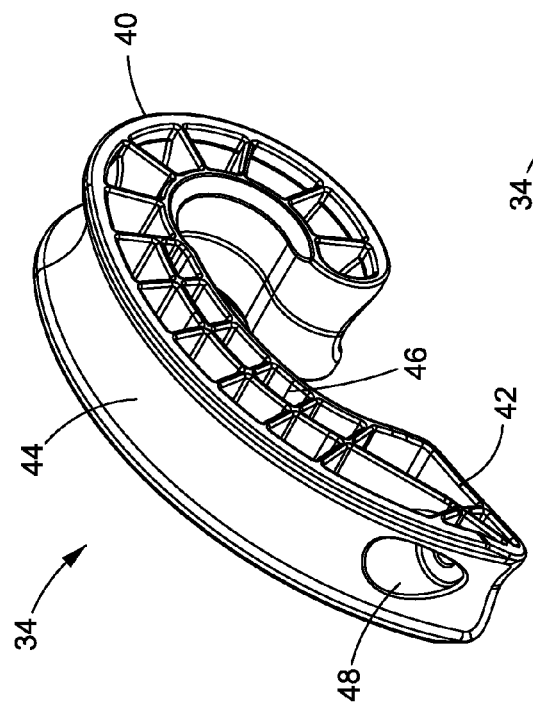

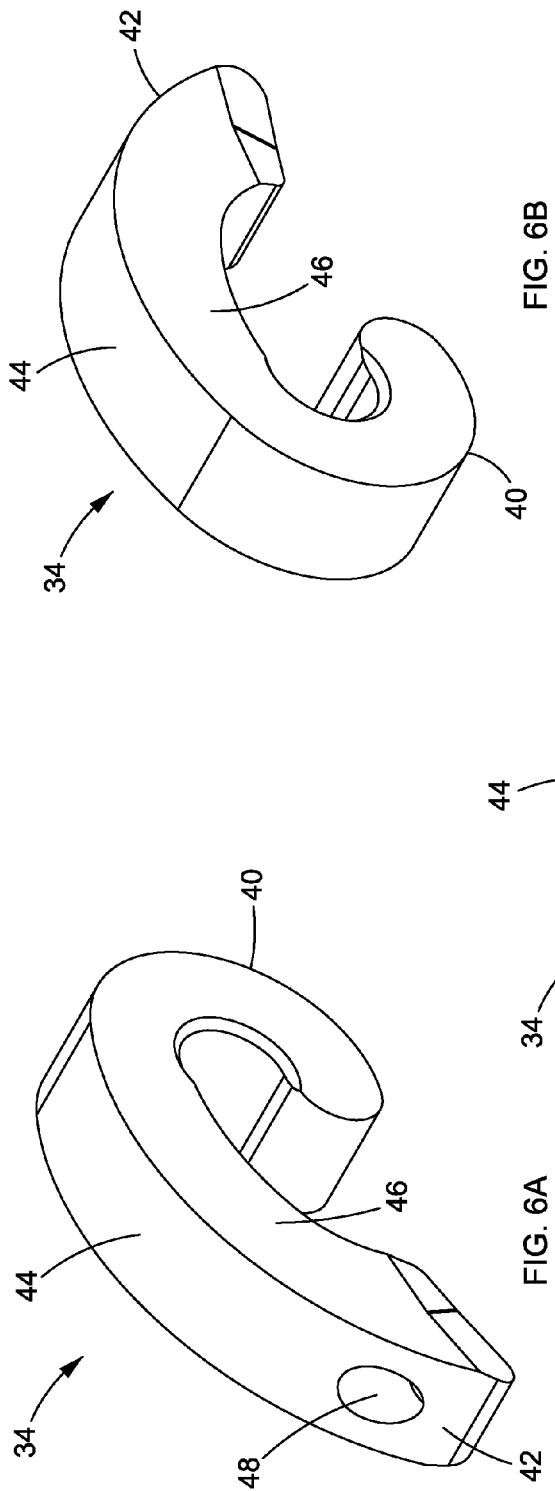

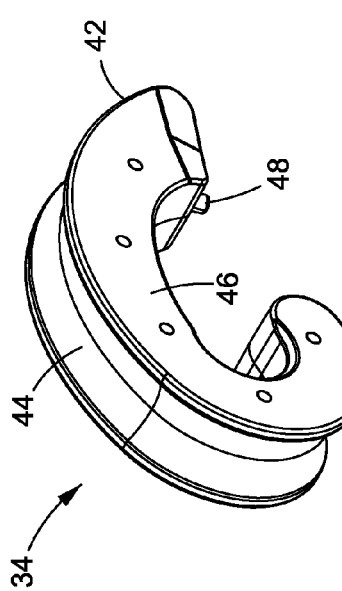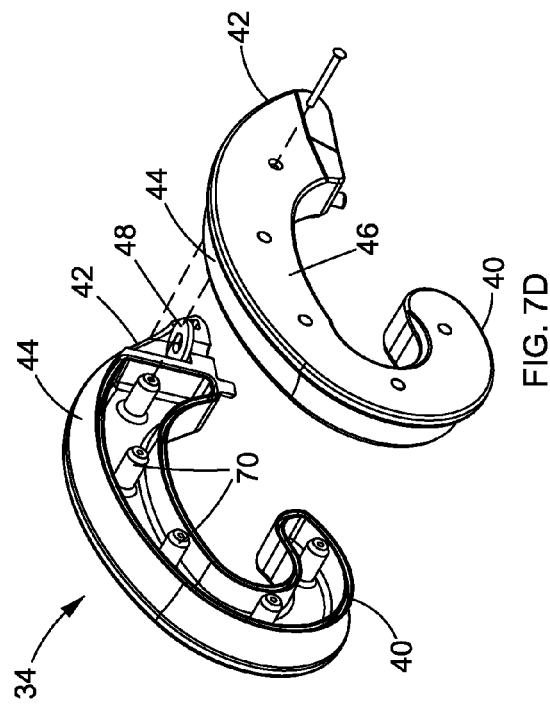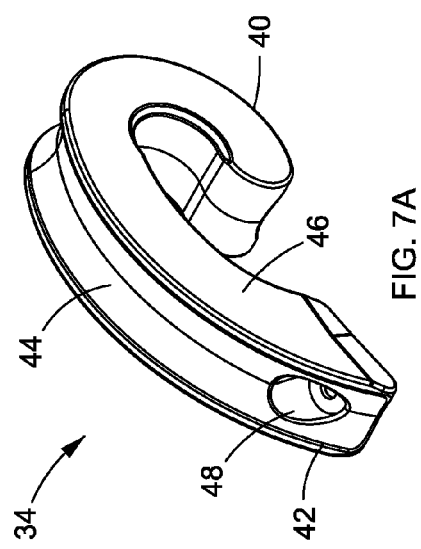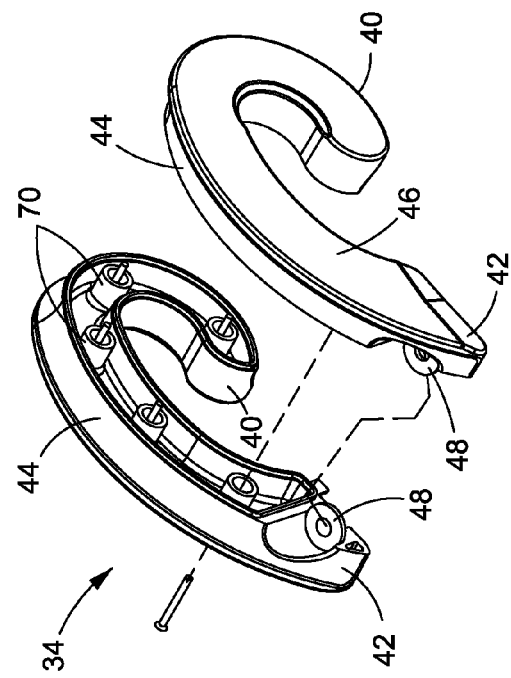

HOOK ROTOR STRIPPER

TECHNOLOGY FIELD

The present invention relates generally to a rotor, and more particularly to a rotor stripper for a rotor.

BACKGROUND

For many years agricultural balers have been used to consolidate and package crop material so as to facilitate the storage and handling of the crop material for later use. Usually, a mower-conditioner cuts and conditions the crop material for windrow drying in the sun. When the cut crop material is properly dried, a baler, for example a round baler, travels along the windrows to pick up the crop material and form it into cylindrically-shaped round bales.

More specifically, pickups of the baler gather the cut and windrowed crop material from the ground, then convey the cut crop material to a rotor for conveyance into a bale chamber within the baler. A drive mechanism operates to activate the pickups, augers, and a rotor of the feed mechanism. A conventional bale chamber may include a pair of opposing sidewalls with a series of belts that rotate and compress the crop material into a cylindrical shape.

The rotor includes rotor fingers that rotate with a rotor shaft to perform the conveyance of the crop material. However, the crop material often becomes entangled with the rotor shaft.

This document describes a rotor stripper for stripping crop material and preventing the crop material from becoming entangled with the rotor shaft, while also efficiently pushing the crop material to the bale chamber. The rotor stripper is easily and securably attached to the rotor shaft.

SUMMARY

Embodiments of the present invention provide a rotor stripper for use in a baler for stripping crop material supplied to a rotor and for conveying the crop material to a bale chamber for formation into a bale. The rotor stripper is configured to securely engage a rotary shaft of a rotor in a baler and to securely fit between adjacent rotor fingers.

The rotor stripper is comprised of a segment comprised of two opposing side walls with an interior section extending between the two opposing side walls. The segment includes a first end portion comprising a curved hook section shaped to securely fit around a majority portion of the circumference of the rotary shaft for secure engagement therewith; a second end portion configured to be secured to a backbone portion of the rotor allowing the segment to remain fixed with respect to rotation of the rotary shaft; and a middle portion extending between the first and second end portions in a curved manner to strip the crop material and facilitate flow of the crop material supplied to the rotor rearward from near the first end portion to beyond the second end portion.

According to an embodiment, the interior section extending between the two opposing side walls comprises a top concave portion. The two opposing side walls may comprise a rimmed portion adjacent the top concave portion.

In another embodiment, the interior section extending between the two opposing side walls comprises a flat profile.

According to an embodiment, the curved hook section extends around a portion of the circumference of the rotary shaft by about 270°.

The rotor stripper, according to an embodiment, includes a mounting boss extending through the segment at the second end portion to secure the segment to the backbone portion of the rotor.

In an embodiment, the interior section is partially hollow. In another embodiment, the segment is comprised of one solid piece. In yet another embodiment, the segment is comprised of two longitudinally half segments, the two longitudinally half segments configured to be joined together lengthwise to form the segment.

Aspects of the present invention also relate to a rotor configured to convey crop material from a pickup assembly to an inlet of a bale chamber. The rotor includes rotor augers for providing rotation; a rotor shaft connected to the rotor augers, the rotor shaft rotating from rotation by the rotor augers; a plurality of rotatable rotor fingers, each rotor finger secured to the rotor shaft for rotation with the rotor shaft, the plurality of rotatable rotor fingers spaced apart along a length of the rotor shaft; and a plurality of rotor strippers, each rotor stripper sized and shaped to securely fit between adjacent rotor fingers and to securely engage the rotary shaft, each rotor stripper comprising a segment comprised of two opposing side walls with an interior section extending between the two opposing side walls, each segment comprising a first end portion comprising a curved hook section shaped to securely fit around a majority portion of the circumference of the rotary shaft for secure engagement therewith; a second end portion configured to be secured to a backbone portion of the rotor allowing the segment to remain fixed with respect to rotation of the rotary shaft; and a middle portion extending between the first and second end portions in a curved manner.

In an embodiment, the plurality of rotor fingers convey the crop material from the pickup assembly and the plurality of rotor strippers strip the crop material from the plurality of rotor fingers for conveyance to the bale chamber rearward from near the first end portion to beyond the second end portion of each of the segments.

According to an embodiment, a first rotor stripper is adjacent a first rotor finger and a last rotor stripper is adjacent a last rotor finger, wherein remaining rotor strippers of the plurality of rotor strippers are fitted between adjacent rotor fingers.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIGS. 4A, 4B, and 4C are views of an exemplary rotor stripper, according to an embodiment;

FIGS. 6A, 6B, and 6C are views of an exemplary rotor stripper, according to an additional embodiment; and FIGS. 7A, 7B, 7C, and 7D are views of an exemplary rotor stripper, according to yet another embodiment.

DETAILED DESCRIPTION OF ILLUSTRATIVE EMBODIMENTS

Embodiments of the present invention relate to rotor strippers secured on a rotor of a baler or other agricultural equipment, where the rotor strippers are sized and shaped to securely fit between adjacent rotor fingers. The rotor strippers function to strip crop material provided from a pickup assembly while also preventing the crop material from becoming wound around a rotor shaft to which the rotor fingers and rotor strippers are secured.

Agricultural balers, such as round balers, are well known in the agricultural industry, and the instant invention can be used with substantially any of such machines. Reference is made, for example, to U.S. Pat. Nos. 5,581,976; 6,877,304; 6,688, 092; 6,644,006; and 6,295,797 that illustrate such balers, the disclosures of which are incorporated herein by reference in their entirety. The present invention can also be used with other balers, such as square balers. Moreover, the present invention is not limited to being used in balers and can be utilized in other pieces of equipment.

Figure 1:
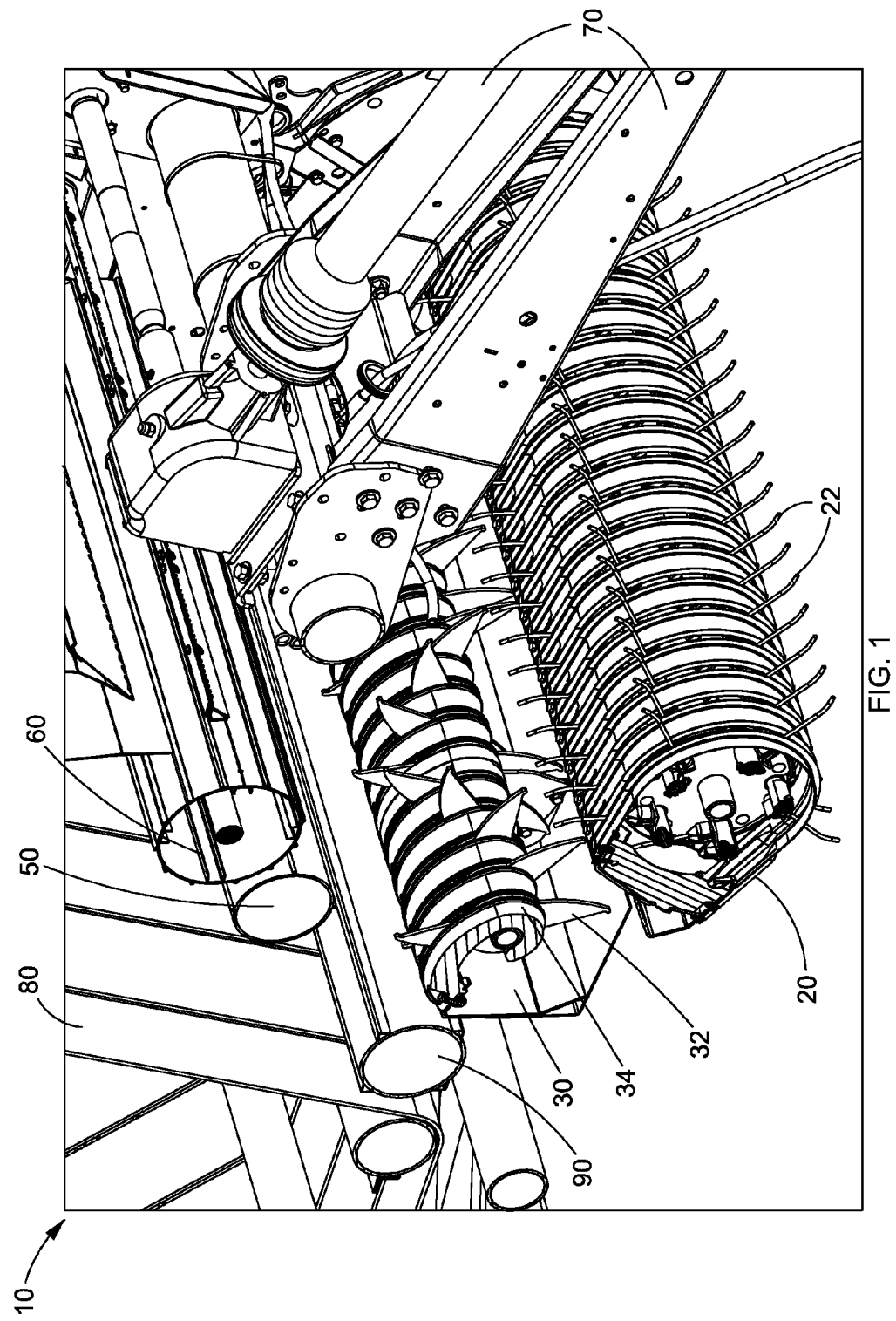
FIG. 1 is a perspective view of a portion of an exemplary round baler in which the present invention may be employed.

FIG. 1 is a perspective view of a portion of an exemplary baler 10 in which the present invention may be employed. A pickup assembly 20 is mounted on a frame (not shown) of the baler 10 and includes a plurality of pickup fingers or tines 22 moveable in a predetermined path to lift crop material from the ground and deliver it rearward to a rotor 30 to convey the crap material toward an inlet defined by a floor roll 90 and a starter roll 50. The rotor 30, the floor roll 90, and the starter roll 50 are supported on the frame of the baler 10. Also shown are a fixed roll 60; tongue components 70 for connection to a tractor (not shown); and a portion of an apron assembly 80 which primarily defines a bale chamber, where the crop material is formed into a bale.

The rotor 30 includes a plurality of rotatable rotor fingers or tines 32 to convey the crop material from the pickup assembly 20 toward the bale chamber. According to aspects of the present invention, the rotor 30 is also provided with a plurality of rotor strippers 34, each rotor stripper 34 sized and shaped to securely fit between adjacent rotor fingers 32. The rotor strippers 34 are sized and shaped to strip the crop material from the rotor fingers 32 while also preventing the crop material from becoming wound around a rotor shaft 36 to which the rotor fingers 32 are secured (see FIGS. 2 and 3). The size and shape of the rotor strippers 34 are such that the crop material is efficiently pushed to the bale chamber, the opening of which is defined by the space between the floor roll 90 and the starter roll 50. The rotor strippers 34 may be, according to some embodiments, aligned with respective pickup tines 22 on the pickup assembly 20.

The exemplary baler 10 shown in FIG. 1 is just one example of equipment in which the rotor strippers 34 may be utilized. The rotor strippers 34 may also be utilized in other balers, croppers, or similar pieces of equipment.

Figure 2:
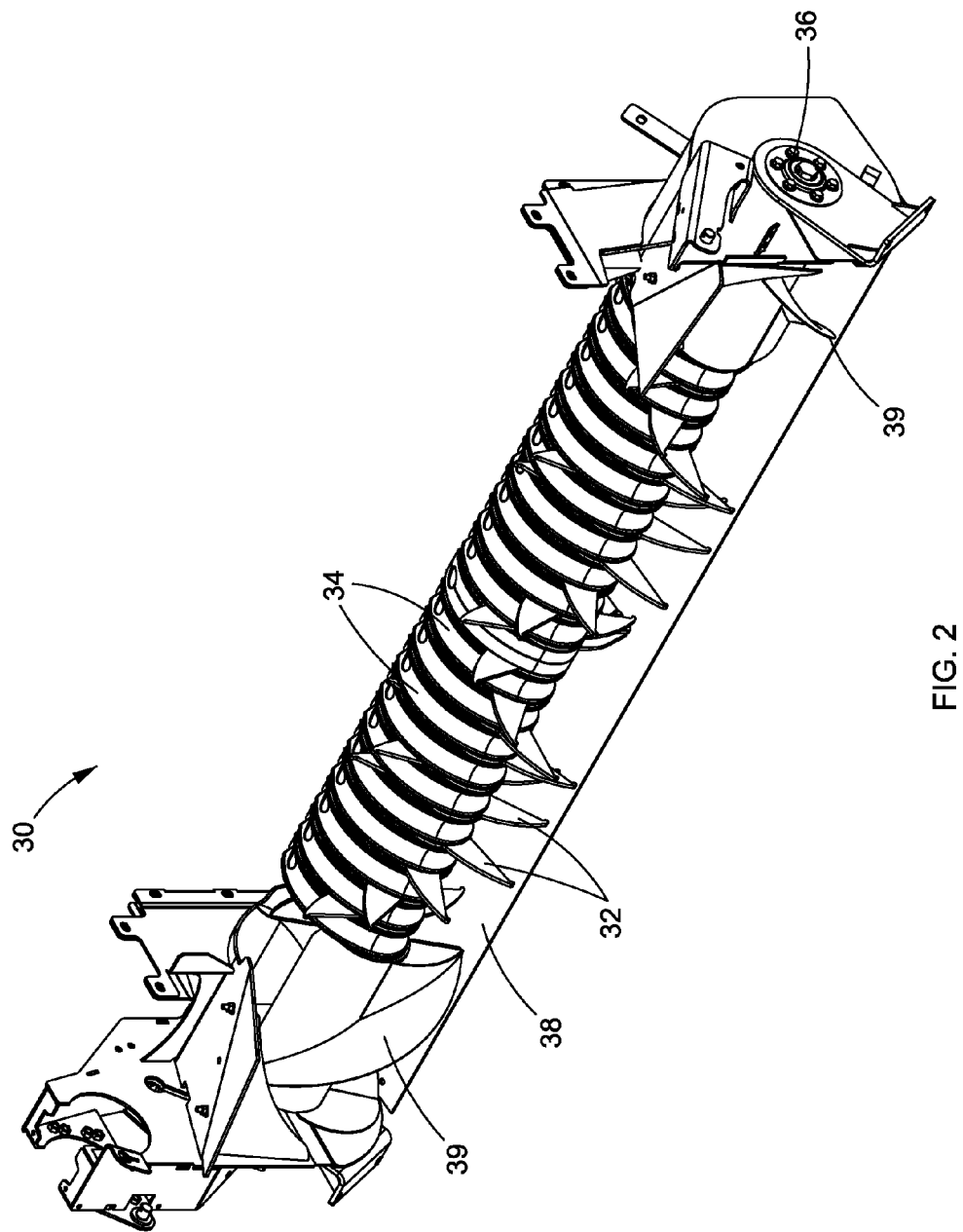
FIG. 2 shows a perspective view of an exemplary rotor in which the present invention may be employed.
Figure 3:
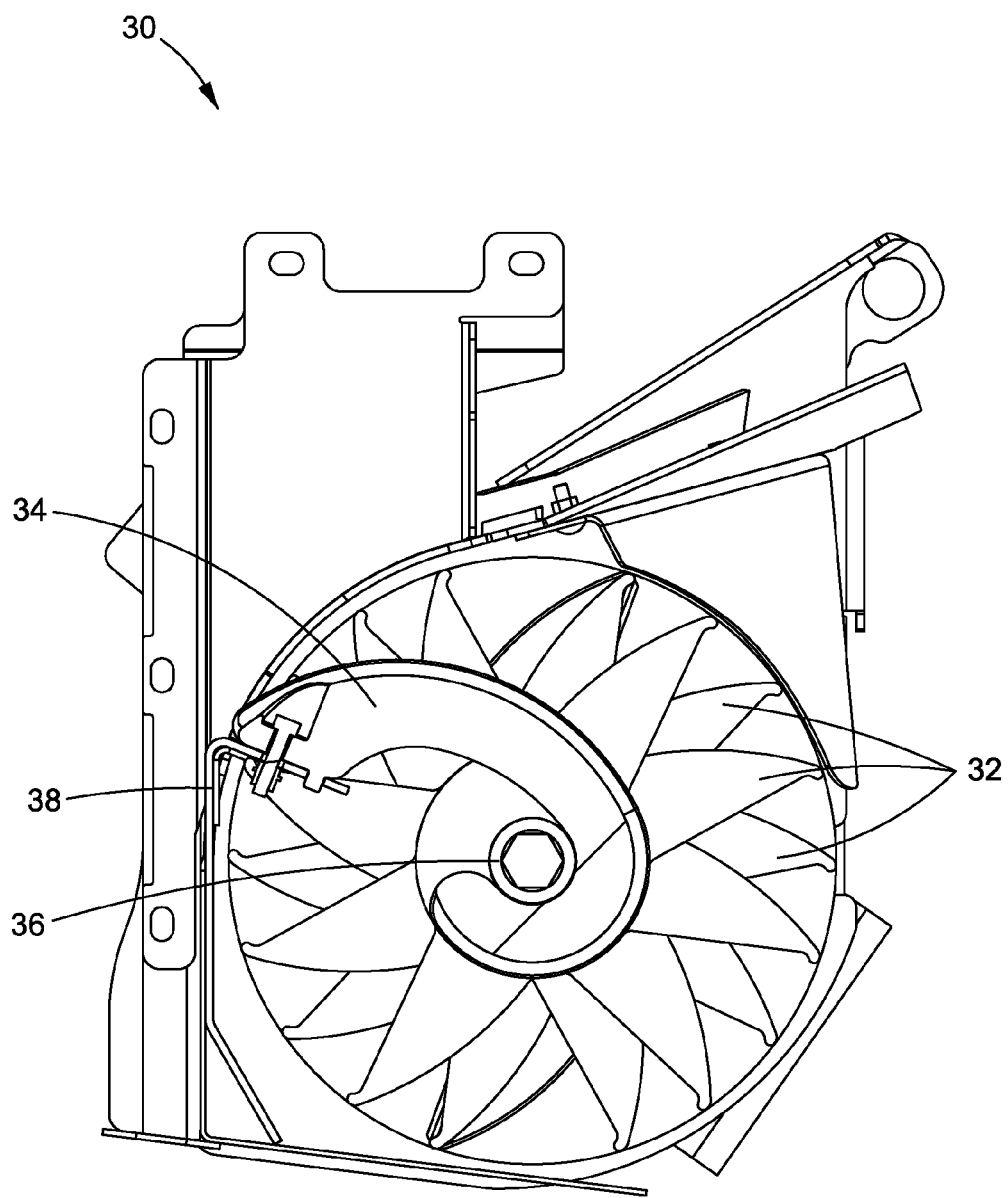
FIG. 3 shows a side view of an exemplary rotor in which the present invention may be employed.
Figure 5B:
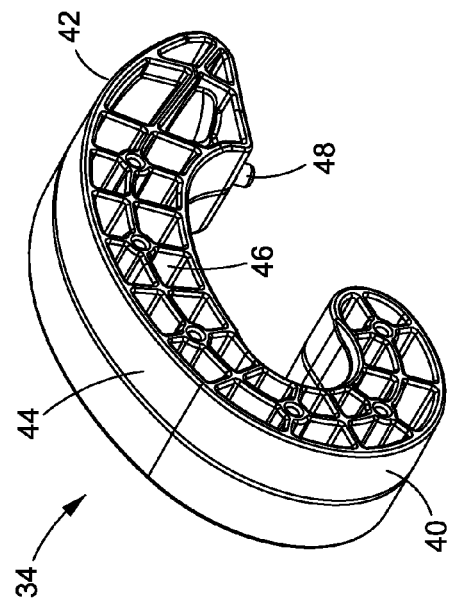
FIGS. 5A, 5B, and 5C are views of an exemplary rotor stripper, according to another embodiment.
Figure 5C:
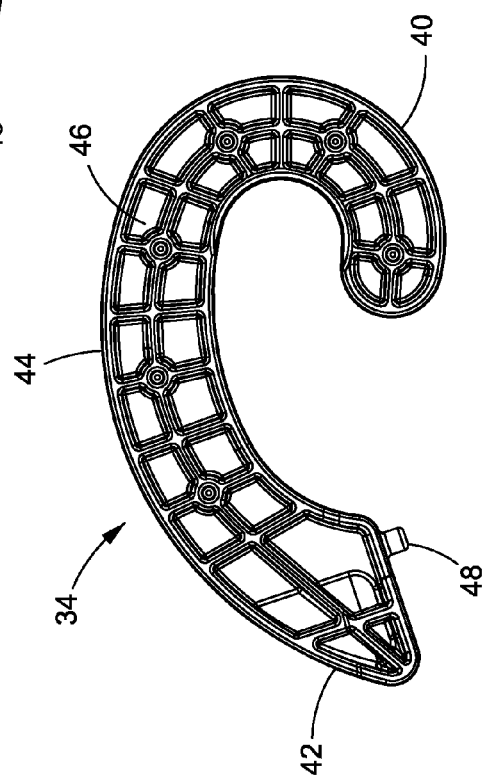
Figure 5A:
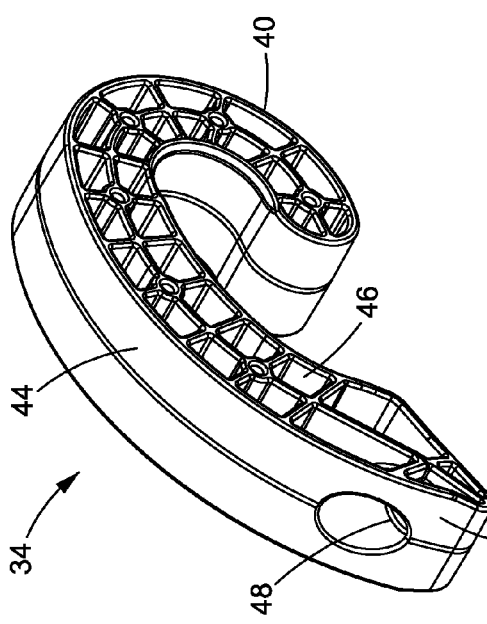

FIG. 2 and FIG. 3 provide a perspective view and a side view, respectively, of the exemplary rotor 30 in which the rotor strippers 34 may be employed. Rotor augers 39 are connected to the rotor shaft 36 and produce rotation, causing the rotor fingers 32 secured thereto to also rotate. The rotor strippers 34, each of which is fitted adjacent to one or two rotor fingers 32, are secured to a backbone portion 38 of the rotor at one end while securely engaging a portion of the rotary shaft 36 at the other end. Thus, in operation, while the rotary shaft 36 and the rotor fingers 32 rotate to convey the crop material from the pickup assembly 20 toward the bale chamber, the rotor strippers 34 remain stationary, stripping the crop material and allowing the crop material to pass over without becoming entangled in or wrapped around the rotary shaft 36.

FIGS. 4A, 4B, 4C through 7A, 7B, 7C, 7D provide views of a rotor stripper 34 according to various embodiments. The rotor stripper 34 is a segment with two opposing side walls 46 with an interior section extending between the two opposing side walls 46. The segment has a first end portion 40 that is a curved hook section shaped to securely fit around a portion of the rotary shaft 36 for secure engagement therewith; a second end portion 42 configured to be secured to a backbone portion 38 of the rotor 30 allowing the segment to remain fixed with respect to rotation of the rotary shaft 36; and a middle portion 44 extending between the first and second end portions 40, 42 in a curved manner to facilitate flow of the crop material supplied to the rotor 30 rearward from near the first end portion 40 to beyond the second end portion 42 (i.e., from the pickup assembly 20 to the bale chamber).

According to some embodiments, the curved hook section (i.e., the first end portion 40) extends around the rotary shaft 36 by about 270°, leaving about 90° of the rotary shaft 36 exposed. By extending around a substantial portion (i.e., at least greater than 50%) of the circumference of the rotary shaft 36, the rotor stripper 34 is securely engaged on the rotary shaft 36. Also, with this coverage, only a small amount of the crop material moving from the pickup assembly 20 to the rotor may directly come into contact with any portions of the rotary shaft 36. According to other embodiments, the curved hook section (i.e., the first end portion 40) may extend around the rotary shaft 36 by other amounts, such as those ranging from about 180° to about 300°. A limiting factor to the amount by which the curved hook section extends around the rotary shaft 36 is that the rotor stripper 34 needs to be able to fit around the rotary shaft 36 for installation thereon.

The rotor stripper 34 also includes a mounting boss 48 at the second end portion 42 to secure the rotor stripper 34 to the backbone portion 38 of the rotor 30. The mounting boss 48 may extend through and out of the second end portion 42, where the portion extending outward provides extra support to maintain the connection of the rotor stripper 34 to the backbone portion 38 of the rotor 30. A bolt may be used to secure the connection between the rotor stripper 34 and the rotor 30, with the bolt passing through the mounting boss 48.

With respect to installation, the rotor stripper 34 is advantageously installed from above or in front of the rotor 30. For example, with reference to FIG. 1, each rotor stripper 34 may be conveniently hooked into place over a top portion of the rotary shaft 36 by placing the curved hook section (i.e., the first end portion 40) of the rotor stripper 34 around the rotary shaft 36. The rotor stripper 34 may then be secured, also from above the rotor 30, to the backbone portion 38 of the rotor 30 via the mounting boss 48. This installation is advantageous as it does not require access to bottom portions of the rotor 30, which may be difficult to reach and access from an installation standpoint.

In the embodiment shown in FIGS. 4A, 4B, and 4C, the interior section extending between the two opposing side walls 46 comprises a top concave portion. According to an embodiment, each of the two opposing side walls 46 have a rimmed portion adjacent the top concave portion, as shown in the perspective views of FIGS. 4A and 4B. The top concave design allows for an increased quantity of the crop material to pass over the rotor stripper 34, and the rimmed portions provides a tight fit with the adjacent rotor fingers 32, thus preventing crop material from becoming entangled around the rotary shaft 36.

In the embodiment shown in FIGS. 5A, 5B and 6A, 6B, the interior section extending between the two opposing side walls 46 comprises a flat profile between the two opposing side walls 46.

In some embodiments, as shown in FIGS. 4A, 4B, and 4C and FIGS. 5A, 5B, and 5C, portions of the interior section extending between the two opposing side walls 46 of the rotor stripper 34 may be hollow. The hollow portions provide a more lightweight and less expensive rotor stripper 34 as compared to a solid structure.

In another embodiment, as shown in FIGS. 6A, 6B, and 6C, the rotor stripper 34 may be comprised of one solid piece.

Provided in FIGS. 7A, 7B, 7C, 7D are views of yet another embodiment in which the segment 34 is comprised of two longitudinally half segments, the two longitudinally half segments configured to be joined together lengthwise to form the rotor stripper 34. Each of the two half segments may be partially hollow, as shown in FIGS. 7C and 7D, or may be solid pieces. A plurality of connectors 70 are provided to secure together the two half segments. The connectors 70 may be spaced apart within the half segments, and opposing connectors 70 may fit together and be secured with a bolt or screw, for example.

The rotor stripper 34 may be formed with a molding process and may be made of a lightweight but strong material that exhibits good wear resistance. Some examples include nylon and plastic, including thermoplastics, such as ultra-high-molecular-weight (UHMW) polyethylene. The rotor stripper 34 is not limited to these materials, and other materials or combinations of materials may be used to form the rotor stripper 34.

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A rotor stripper configured to securely engage a rotary shaft of a rotor in a baler for stripping crop material supplied to the rotor, the rotor stripper configured to securely fit between adjacent rotor fingers, the rotor stripper comprising:
a segment comprised of two opposing side walls with an interior section extending between the two opposing side walls, the segment comprising a first end portion comprising a curved hook section forming an opening shaped to securely extend around a majority portion of a circumference of the rotary shaft for secure engagement therewith; a second end portion configured to be secured to a backbone portion of the rotor allowing the segment to remain fixed with respect to rotation of the rotary shaft; and a middle portion extending between the first and second end portions in a curved manner to strip the crop material and facilitate flow of the crop material supplied to the rotor rearward from near the first end portion to beyond the second end portion; and
a gap located between an end of the hook section and the second end portion that is linked by a passage to the opening wherein a width of the gap is at least as wide as a width of the opening and the gap is offset such that it is closer than the opening to second end portion.

2. The rotor stripper of claim 1, wherein the interior section extending between the two opposing side walls comprises a top concave portion.

3. The rotor stripper of claim 2, wherein each of the two opposing side walls comprises a rimmed portion adjacent the top concave portion.

4. The rotor stripper of claim 1, wherein the interior section extending between the two opposing side walls comprises a flat profile.

5. The rotor stripper of claim 1, wherein the curved hook section extends around the circumference of the rotary shaft by about 270°.

6. The rotor stripper of claim 1, further comprising a mounting boss extending through the segment at the second end portion to secure the segment to the backbone portion of the rotor.

7. The rotor stripper of claim 1, wherein the interior section is partially hollow.

8. The rotor stripper of claim 1, wherein the segment is comprised of one solid piece.

9. The rotor stripper of claim 1, wherein the segment is comprised of two longitudinally half segments, the two longitudinally half segments configured to be joined together lengthwise to form the segment.

10. A rotor configured to convey crop material from a pickup assembly to an inlet of a bale chamber, the rotor comprising:
rotor augers for providing rotation;
a rotor shaft connected to the rotor augers, the rotor shaft rotating from rotation by the rotor augers;
a plurality of rotatable rotor fingers, each rotor finger secured to the rotor shaft for rotation with the rotor shaft, the plurality of rotatable rotor fingers spaced apart along a length of the rotor shaft; and
a plurality of rotor strippers, each rotor stripper sized and shaped to securely fit between adjacent rotor fingers and to securely engage the rotary shaft, each rotor stripper comprising a segment comprised of two opposing side walls with an interior section extending between the two opposing side walls, each segment comprising a first end portion comprising a curved hook section shaped to securely fit around a majority portion of a circumference of the rotary shaft for secure engagement therewith; a second end portion configured to be secured to a backbone portion of the rotor allowing the segment to remain fixed with respect to rotation of the rotary shaft; and a middle portion extending between the first and second end portions in a curved manner; and
wherein the stripper segments extends forwardly from the backbone above and then forward of the shaft and ends at a tip of the hook rearward of the axis of rotation of the rotor creating an opening between the tip and the second end portion.

11. The rotor of claim 10, wherein the plurality of rotor fingers convey the crop material from the pickup assembly and the plurality of rotor strippers strip the crop material from the plurality of rotor fingers for conveyance to the bale chamber rearward from near the first end portion to beyond the second end portion of each of the segments.

12. The rotor of claim 10, wherein a first rotor stripper is adjacent a first rotor finger and a last rotor stripper is adjacent a last rotor finger, wherein remaining rotor strippers of the plurality of rotor strippers are fitted between adjacent rotor fingers.

13. The rotor of claim 10, wherein the interior section extending between the two opposing side walls of each segment comprises a top concave portion.

14. The rotor of claim 13, wherein each of the two opposing side walls of each segment comprises a rimmed portion adjacent the top concave portion.

15. The rotor of claim 10, wherein the curved hook section of each segment extends around the circumference of the rotary shaft by about 270°.

16. The rotor of claim 10, wherein each segment of each rotor stripper further comprises a mounting boss extending through the segment at the second end portion to secure the respective segment to the backbone portion of the rotor.

17. The rotor of claim 10, wherein the interior section of one or more segments is partially hollow.

18. The rotor of claim 10, wherein one or more segments is comprised of one solid piece.

19. The rotor of claim 10, wherein one or more segments is comprised of two longitudinally half segments, the two longitudinally half segments configured to be joined together lengthwise to form the respective one or more segments.

20. The rotor of claim 10, wherein the rotor is installed on a baler to operate in conjunction with the pick-up assembly to convey crop material to form a bale.

* * * * *